United States Patent
Hundt et al.

(10) Patent No.: US 6,934,943 B2
(45) Date of Patent: Aug. 23, 2005

(54) OPTIMIZATION OF CONTROL TRANSFERS TO DYNAMICALLY LOADED MODULES

(75) Inventors: Robert Hundt, Sunnyvale, CA (US); Tom Lofgren, Sunnyvale, CA (US); Vinodha Ramasamy, Campbell, CA (US)

(73) Assignee: Hewlett-Packard Development Company, Houston, TX (US)

( * ) Notice: Subject to any disclaimer, the term of this patent is extended or adjusted under 35 U.S.C. 154(b) by 658 days.

(21) Appl. No.: 10/004,015

(22) Filed: Oct. 18, 2001

(65) Prior Publication Data

US 2003/0079215 A1 Apr. 24, 2003

(51) Int. Cl.[7] ............................. G06F 9/45; G06F 9/44
(52) U.S. Cl. ..................... 717/159; 717/153; 717/164
(58) Field of Search ............................. 717/151–164, 717/147, 127; 711/213; 714/38; 707/8

(56) References Cited

U.S. PATENT DOCUMENTS

| | | | | | |
|---|---|---|---|---|---|
| 5,615,400 A | * | 3/1997 | Cowsar et al. | ............... | 719/332 |
| 5,822,787 A | * | 10/1998 | Zucker | ........................ | 711/213 |
| 5,923,882 A | * | 7/1999 | Ho et al. | ..................... | 717/147 |
| 5,956,479 A | * | 9/1999 | McInerney et al. | ........... | 714/38 |
| 6,026,235 A | * | 2/2000 | Shaughnessy | ................ | 717/127 |
| 6,185,733 B1 | * | 2/2001 | Breslau et al. | ............... | 717/163 |
| 6,665,671 B2 | * | 12/2003 | Coutant | ......................... | 707/8 |

* cited by examiner

*Primary Examiner*—Anil Khatri
*Assistant Examiner*—Trent J. Roche

(57) ABSTRACT

Method and apparatus for optimization of an executable program that calls procedures in a shared library. Code segments that read procedure address information from a linkage table are first identified. Each linkage code segment is associated with a call to a procedure in the shared library, and the address information in the linkage table is associated with the procedures in the shared library. During program execution, the address information is read from the linkage table and substitute code segments are generated for the linkage code segments. Each substitute code segment has direct loads of the address information for calling the associated procedure instead of the original references to the linkage table. Thereafter, the substitute code segments are executed instead of the linkage code segments.

20 Claims, 4 Drawing Sheets

OPTIMIZATION OF CONTROL TRANSFERS TO DYNAMICALLY LOADED MODULES

FIELD OF THE INVENTION

The present invention generally relates to transfers of control to dynamically loaded modules during program execution, and more particularly to optimization of the code that transfers control from within a program to a dynamically loaded procedure.

BACKGROUND

Many operating systems provide facilities for dynamic binding of program modules which are independently compiled as shared libraries or dynamic link libraries (DLLs). Dynamic binding offers the advantages of strong modularization, code reuse, improved cache behavior, and reduced compilation time as well other advantages. However, the complex instruction sequences that are generated for calls to and between shared libraries may inhibit performance.

In some systems, the interface to "foreign procedures" in shared library modules is accomplished with a procedure linkage table (PLT). The reason that a foreign procedure in a dynamically loaded shared library module cannot be called directly is that the address of the foreign procedure is unknown until runtime. The PLT provides a writable data segment that can be updated by a dynamic loader with the addresses of the foreign procedures. Even though the term "procedure" is used in this description, it will be appreciated that the invention is applicable to other functional elements such as functions, routines, or methods as known in various languages.

Each entry in the PLT contains information for referencing a foreign procedure, either in the form of an address of a foreign procedure or the address of a loader routine located within the dynamic loader. When an application tries to branch to a target procedure via the PLT and the corresponding PLT entry contains a pointer to the loader routine, the loader routine is executed. The loader routine identifies the target procedure and overwrites the PLT entry with the information for referencing the target procedure. In an alternative method, the dynamic loader fills all the PLT entries on the loading of a module. For both methods of filling the PLT, the facts remains that the PLT must be accessed in order to branch to a foreign procedure, and any access to the PLT is a costly read from memory.

A system and method that address the aforementioned problems, as well as other related problems, are therefore desirable.

SUMMARY OF THE INVENTION

A method and apparatus for optimization of an executable program that calls procedures in a shared library are provided in various embodiments of the invention. Code segments that read procedure address information from a linkage table are first identified. Each linkage code segment is associated with a call to a procedure in the shared library, and the address information in the linkage table is associated with the procedures in the shared library. During program execution, the address information is read from the linkage table and substitute code segments are generated for the linkage code segments. Each substitute code segment has direct loads of the address information for calling the associated procedure instead of the original references to the linkage table. Thereafter, the substitute code segments are executed instead of the linkage code segments.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the invention dynamically optimizes a program that calls dynamically linked procedures by optimization of the code that transfers control to the dynamically linked procedures. In one embodiment, the information from a procedure linkage table is used to simplify the code sequences that transfer control to dynamically linked procedures. Those skilled in the art will recognize other embodiments and advantages of the invention.

Figure 1:
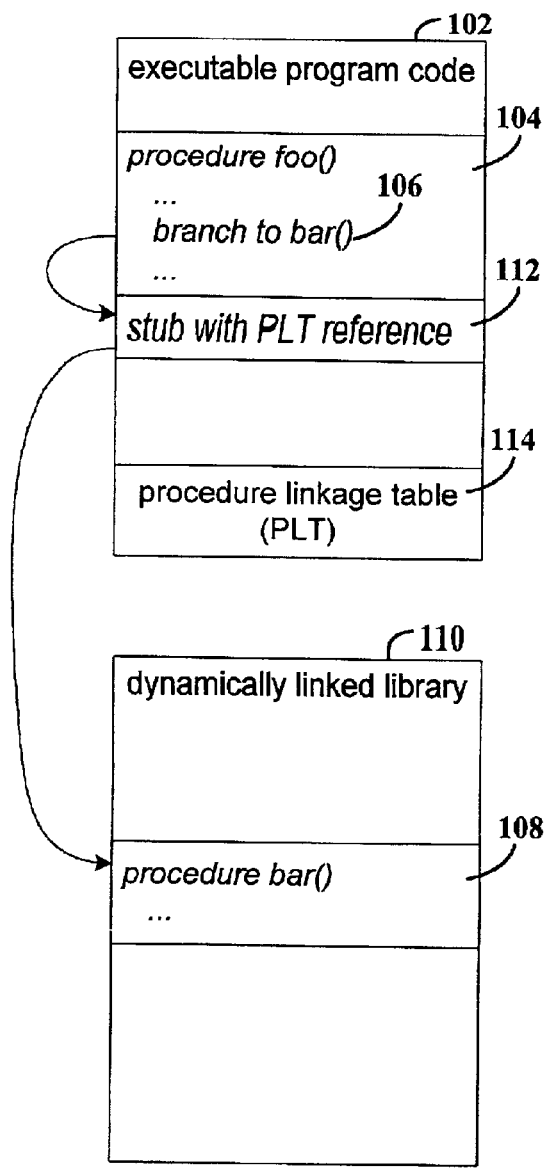
FIG. 1 illustrates a pre-optimized version of an executable program code 102 that calls a procedure in a dynamically linked library.

FIG. 1 illustrates a pre-optimized version of an executable program code 102 that calls a procedure in a dynamically linked library 110. Executable program code 102 includes procedure foo( ) 104 that includes statement 106 that branches to the procedure bar( ) 108. The procedure bar( ) is located in dynamically linked library 110, which is compiled separate from executable program code 102 and thereafter dynamically linked.

Since the address of bar( ) in the dynamically linked library 110 is not known when executable program code 102 is compiled, stub code 112 is created with references to PLT 114. The dynamic loader (not shown) updates the PLT when the dynamically linked library is linked to the executable program code 102. Each entry in the PLT includes a global pointer that references the base address of the data segment of the dynamically linked library and a procedure pointer that references a procedure in the library. It will be appreciated that other architectures may have alternative implementations of a PLT. Stub code 112 loads the address of bar( ) from the PLT and branches to the code in the dynamically linked library.

Figure 2:
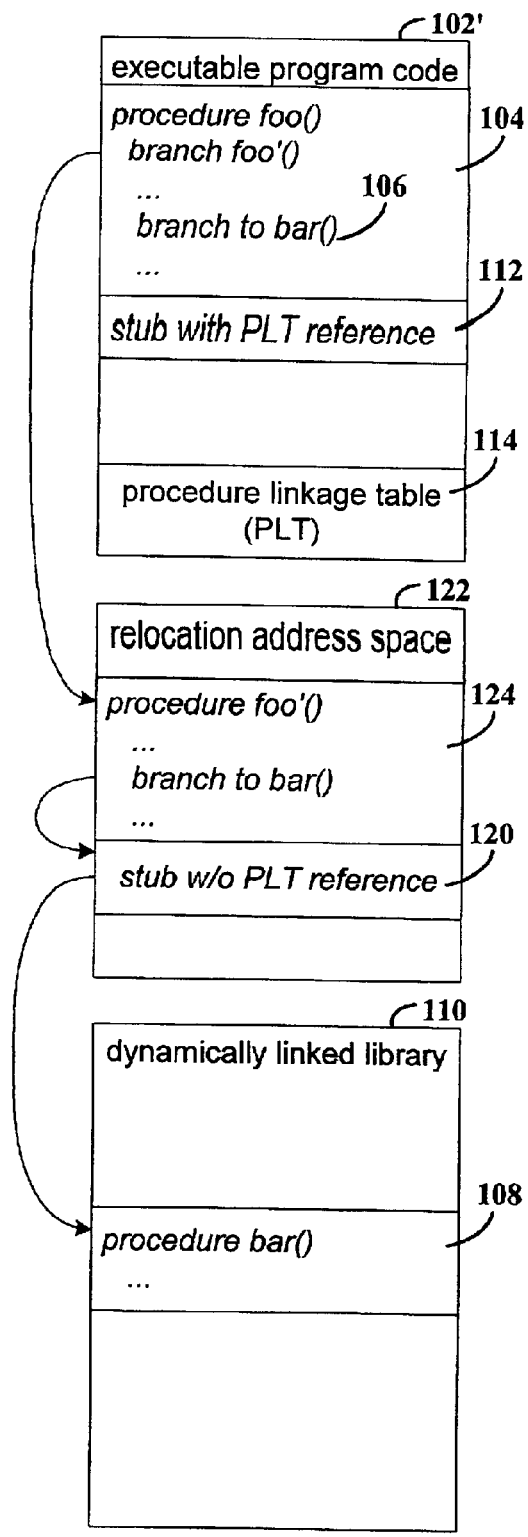
FIG. 2 is illustrates an executable program code in which procedure linkage table (PLT) stub code has been optimized for calling a procedure in a dynamically linked library procedure, in accordance with one embodiment of the invention.

FIG. 2 illustrates an executable program code 102' in which PLT stub code has been optimized in accordance with one embodiment of the invention, In the embodiment of FIG. 2, the stub 112 having the PLT reference is replaced with a stub 120 that does not reference the PLT. Thus, when bar( ) is called, the costs associated with reading PLT 114 are eliminated.

In one embodiment, the executable program is monitored during execution. When foo( ) 104 is called, the code is analyzed for calls to procedures in the dynamically linked library 110. Finding that bar( ) 108 is called, a new version of foo( ) 104 is created and stored in relocation address space 122 as foo'( ) 124. Part of foo'( ) is stub code 120 that accomplishes the transfer of control from foo'( ) to bar( ) in the dynamically linked library.

Depending on how stub code 120 is implemented, the code may occupy more space or less space than stub code 112. If stub code 120 occupies more space, then implementation in the relocation address space is required in order to avoid overwriting unrelated code in executable program code 102'. If stub code 120 occupies less space, then the code at stub 112 may be overwritten.

In the implementation where stub 120 is generated and stored in relocation address space 122, along with foo'( ), the first instruction in foo( ) 104 is replaced with a branch to foo'( ).

The following example uses code generated by the HP IC8 compiler to illustrate one implementation in which the stub code is optimized. The code is in IA-64 assembly language. The original code is:

addl r15=-304, r1;;
ld8 r16=[r15], 8
adds r14=0, r1;; // save r1 in r14
ld8 r1=[r15]
mov b6=r16,.+0
br.cond.sptk.few b6;;

The stub code above loads the global pointer and function address from the PLT and branches to the external procedure via an indirect branch instruction. The register r1 is the global pointer (gp), and PLT's are located relative to this gp. The instruction,
addl r15=-304, r1
loads a function address from an index (304) from the PLT. The next instruction,
ld8 r16=[r15],8
reads the "next" value from the PLT, by increasing the index in r15 by 8 and then reading an 8-byte value using the updated index. The addl and ld8 instructions read a complete PLT entry (global pointer and function address). The layout for this kind of stub is always the same and can be identified by pattern matching.

The optimized stub code is:

movl b6 addr-of-bar
adds r14=0,r1;;
movl r1 gp-of-bar
br.cond.sptk.few b6;;

The optimized stub code above directly loads the global pointer and the function pointer using immediate load instructions, for example, movl. The movl instructions do not address the program's data space and are therefore executed quickly.

Even though the optimized stub has fewer instructions than the non-optimized stub, the optimized stub may occupy more address space than does the non-optimized stub code, depending on the instruction architecture and size of instructions. For example, the HP IA-64 hardware architecture is a very-long-instruction-word (VLIW) architecture. Up to three instructions are packed into a single bundle, and certain dependency relations between instructions in a bundle must be observed. In this architecture, each movl instruction in the optimized stub occupies a complete bundle for a total of three bundles for the optimized stub. In contrast, the non-optimized version of the code only occupies two bundles.

Figure 3:
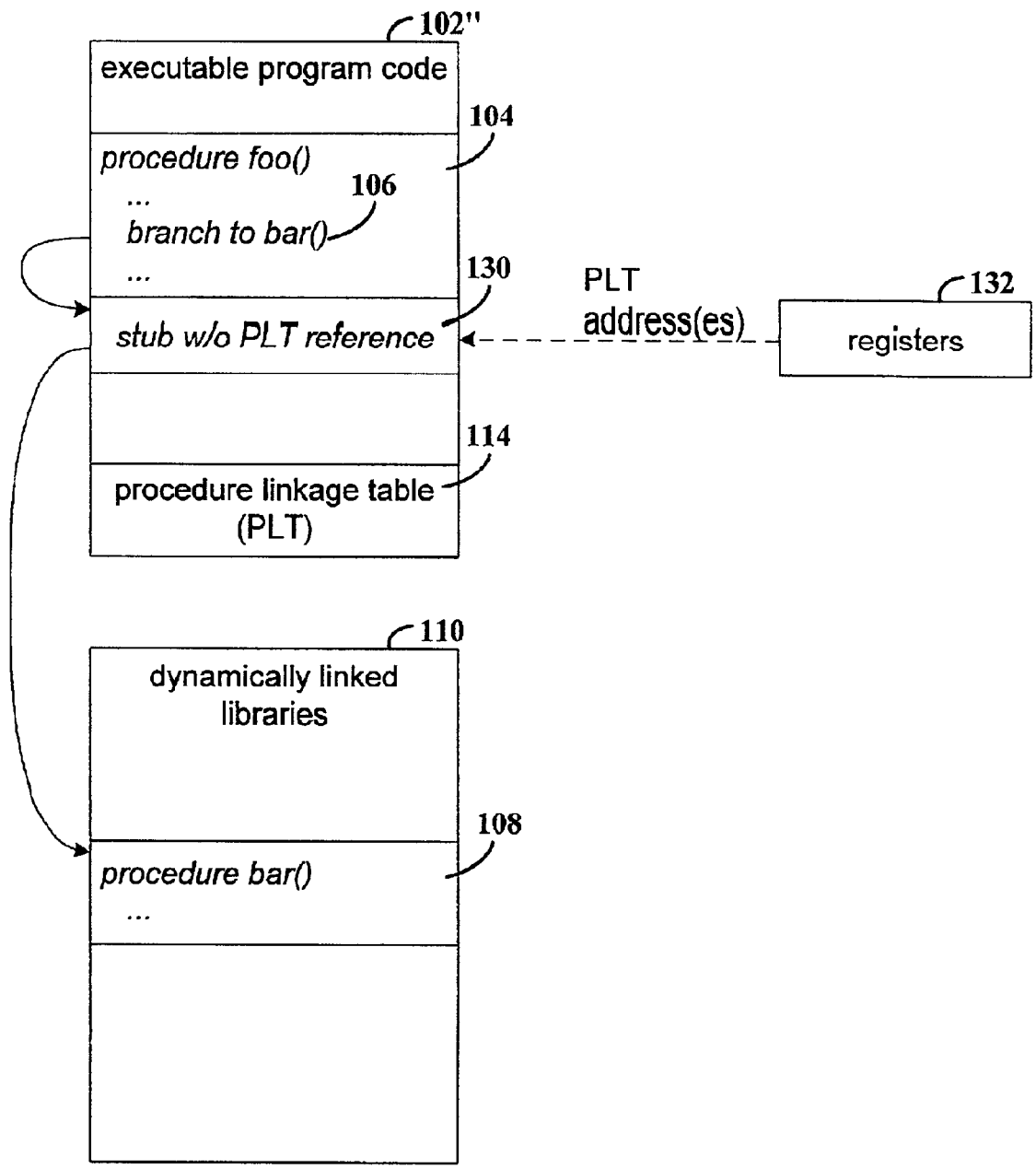
FIG. 3 illustrates an executable program code in which PLT stub code has been optimized, using available registers, in accordance with another embodiment of the invention.

FIG. 3 illustrates executable program code 102" in which PLT stub code has been optimized, using available registers, in accordance with another embodiment of the invention. When foo( ) is called, the procedure is analyzed for registers that are not used during execution of foo( ). The stub code is then optimized by pre-loading the global pointer and function pointer for bar( ) into the selected registers, and generating new stub code that uses the selected registers instead of referencing the PLT. Stub code 130 uses the PLT addresses that are pre-loaded into the selected register 132.

The example code below illustrates the use of registers in pre-loading PLT values, which reduces the space occupied by the instructions that perform the indirect branch to the dynamically linked procedure.

adds r14=0, r1;; // save r1 in r14
mov b6=grx // saved addr in grx
add r1=r0,gry // saved gp in gry
br.cond.sptk.few b6;;

The optimized stub code above uses the global pointer and function pointer which were preloaded into the registers, gry and grx, respectively, from the PLT. The values from the PLT are read when the code is optimized, and the optimized code is programmed to load these values into the registers. No-operation (nop) instructions may be inserted to make the space occupied by the optimized stub code equal to the space occupied by the non-optimized stub code.

An example process for identifying registers that are not used in a procedure is described in the patent application entitled, "Allocating Registers for use in Programming Code Modification", by Vinodha Ramasamy and Jenn-Yuan Tsai, filed on Jan. 19, 2001, and having application/patent No. 09/765,931, the contents of which are incorporated herein by reference.

Figure 4:
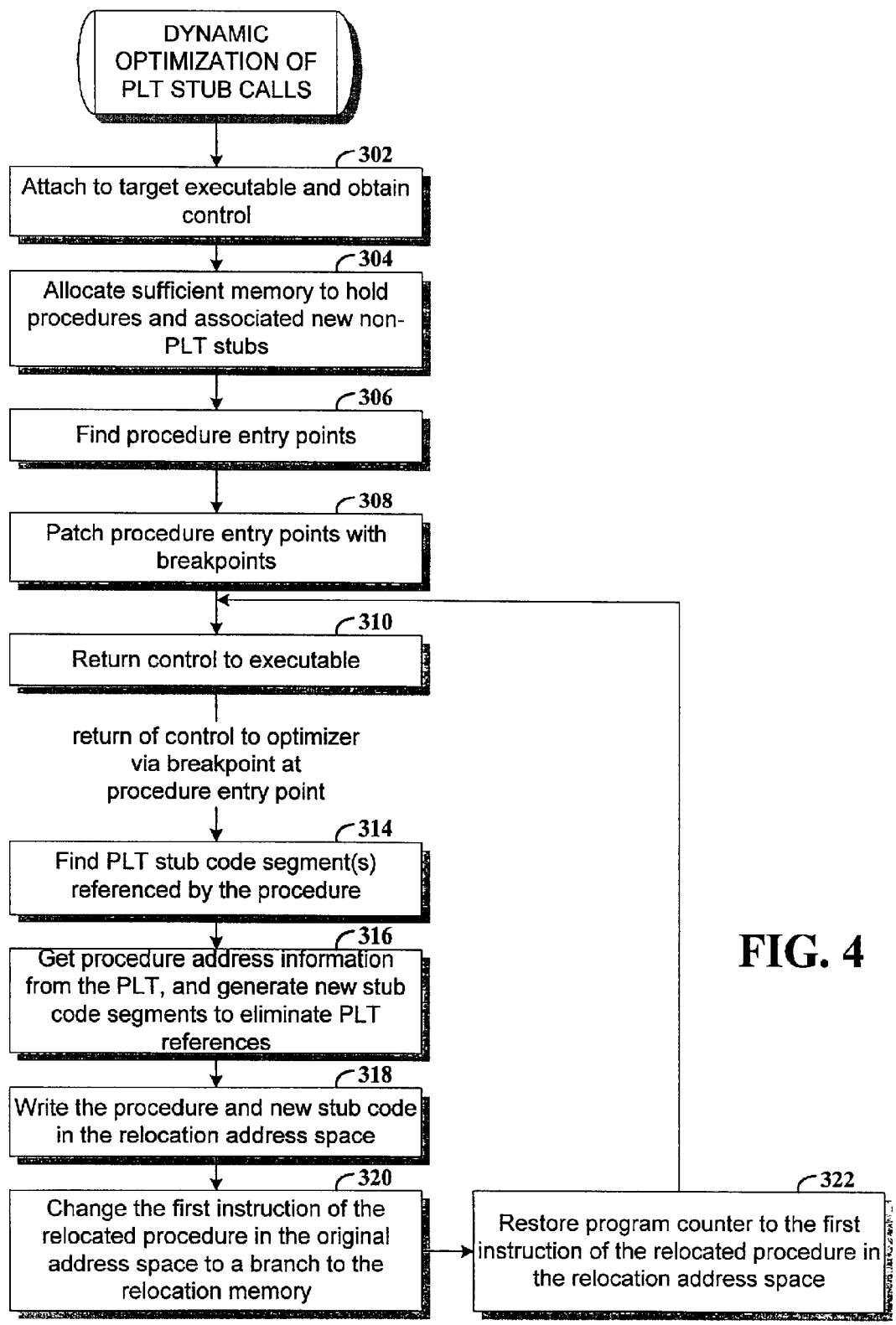
FIG. 4 is a flowchart of an example process for dynamic optimization of PLT stub code in accordance with one embodiment of the invention.

FIG. 4 is a flowchart of an example process for dynamic optimization of PLT stub code in accordance with one embodiment of the invention. The process generally entails identifying at runtime a call to a dynamically linked procedure, generating optimized stub code that transfers control to the dynamically linked procedure, and storing the optimized stub code in a relocation address space along with the calling procedure.

At step 302, an instrumentation process attaches to a target executable application and obtains control. Those skilled in the art will appreciate that this step is accomplished using known, conventional techniques. At step 304, the process allocates and maps shared memory for use by the instrumentation process and the executable application. An example process used to allocate and map shared memory is described in the patent/application entitled, "Dynamic Instrumentation of an Executable Program", by Hundt et al., filed on Apr. 11, 2001, and having patent/application Ser. No. 09/833,248, the contents of which are incorporated herein by reference.

At step 306, entry points of the functions in the executable application are located. In an example embodiment, the present invention uses compiler-generated checkpoints to identify function entry points and endpoints in executable program code. The function entry points and end-points are then used to support analysis of the executable program code. Compiler-generated checkpointing is described in the patent/application entitled, "COMPILER-BASED CHECKPOINTING FOR SUPPORT OF ERROR RECOVERY", by Thompson et al., filed on Oct. 31, 2000, and having patent/application Ser. No. 09/702,590, the contents of which are incorporated herein by reference.

Each of the function entry points is patched with a breakpoint at step 308. The instructions at the function entry points are saved in a table (not shown) so that they can be restored at the appropriate time. At step 310, control is returned to the executable program. When a breakpoint is encountered at a function entry point in the executable program, control is returned to the optimizer process.

The process continues at step 314 when a breakpoint is encountered during program execution. At step 314, the procedure code is analyzed for stub code segments that transfer control to a dynamically linked procedure. In one embodiment, the stub code segments are identified by searching for references to the PLT. At step 316, new stub code segments are generated using information that is read from the PLT. The example code above illustrates two possible versions of optimized stub code.

Steps 314 and 316 together comprise an analysis phase during which various optimizations are made to PLT stub code. In another embodiment, the analysis further includes monitoring for successive calls to the same shared library. When successive calls are detected, redundant loads of global pointers can be eliminated.

Additional analysis involves checking whether the called procedure can be reached with an IP-relative branch ("direct" branch) instead of an indirect branch. For example, in the Hewlett-Packard IA64 instruction architecture, indirect branch instructions are used to reach code that is beyond the limits of a direct branch (in addressing terms). Since direct branch instructions execute faster than indirect branch instructions, it is desirable to use direct branches where possible. If the called procedure is in a library that is within the range of a direct branch instruction, the indirect branch instruction is replaced with a direct branch instruction. It will be appreciated that the replacement of indirect with direct branch instructions is more likely in calls between libraries rather than calls from an application program to a shared library because shared libraries are generally loaded far apart from the application program but close to each other.

At step 318, the procedure and optimized stub code segments are written to the relocation address space. Then at step 320, the first instruction of the procedure in the original address space is changed to a branch to the new version of the function in the relocation address space. Finally, at step 322, the system program counter is restored to reference the first instruction in the relocated procedure. Control is then returned to step 310.

Figure 5:
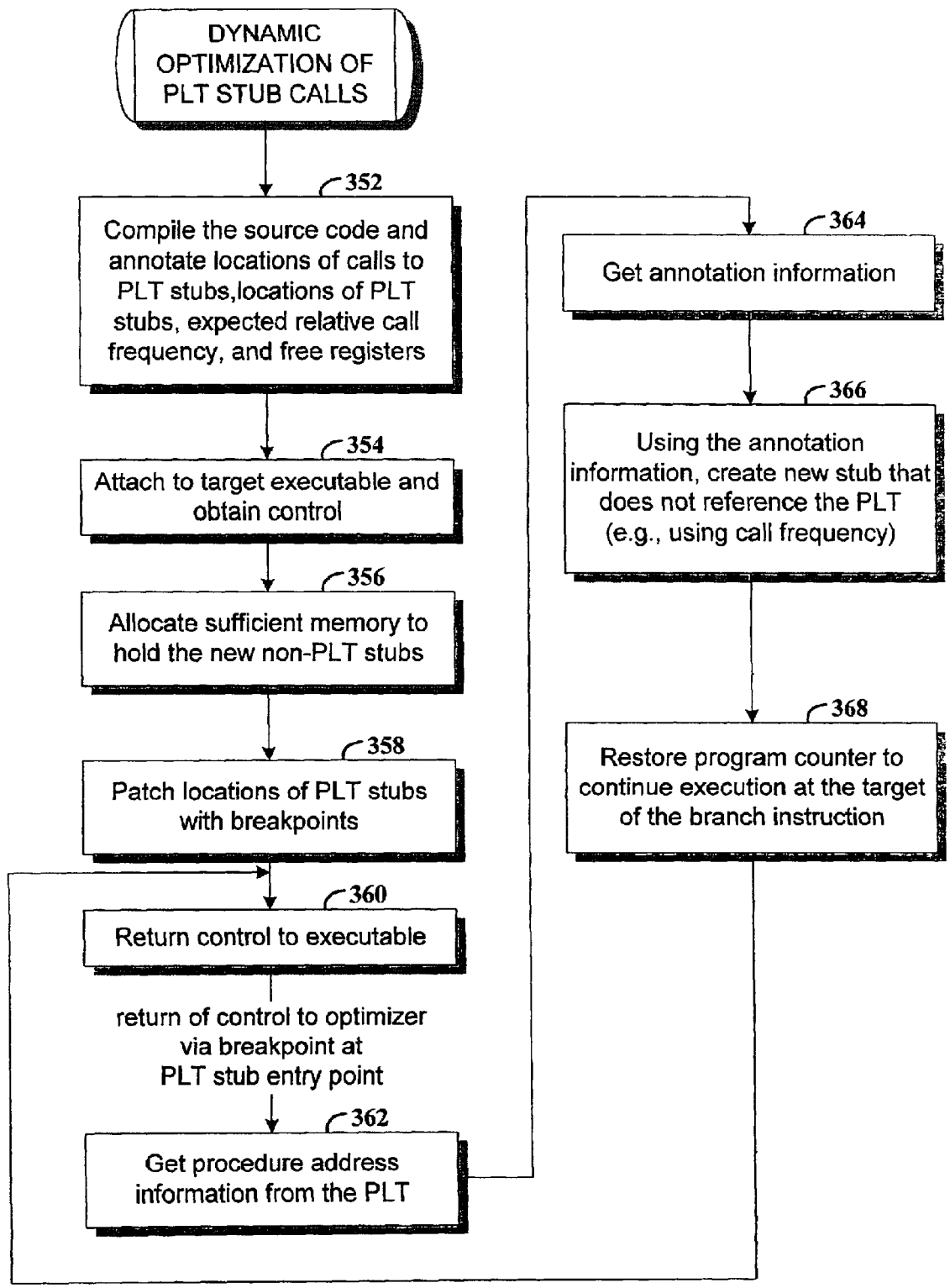
FIG. 5 is a flowchart of an example process for optimization of PLT stub code in accordance with another embodiment of the invention.

FIG. 5 is a flowchart of an example process for optimization of PLT stub code in accordance with another embodiment of the invention. In this embodiment annotation information is added to the executable program code during compilation, and the annotations are used at runtime to identify calls to dynamically linked procedures and the associated stub code segments. Compiler annotations are also used to identify particular functions for which the stub code segments should be optimized, which minimizes the number of breakpoints that interrupt program execution.

Annotations also indicate, for example, those procedure calls that are expected to be executed often and those registers that can be used for pre-loading addresses from the PLT. To further support dynamic optimization, the compiler may generate dummy load instructions. During program execution, the dummy load instructions are overwritten with other load instructions that load the values that were previously read from the PLT, and the optimized stub code segments are executed to transfer control to the dynamically linked procedures.

At step 352, the source code is compiled and annotations are added to the executable program code that indicate calls to procedures via PLT stubs, locations of PLT stubs, expected frequency of calls via the PLT stubs, and registers that are available for optimizing the PLT stubs. Steps 354 and 356 are the same as steps 302 and 304 of FIG. 4.

At step 358, the annotation information is used to identify PLT stubs and patch the locations of the PLT stubs with breakpoints. As explained above, the breakpoints may be selectively inserted in response to annotations of selected ones of the PLT stubs. Control is then returned to the executable program at step 360.

When a breakpoint is encountered, control is returned to the optimization process at step 362. At step 362, the address information is read from the PLT for the called procedure, and the annotation information is read at step 364. Using the annotation information, the PLT stub is optimized at step 366. For example, where the annotation information indicates registers that are available, the PLT stub code is optimized using the registers as described above in association with FIG. 3. It will be appreciated that the various embodiments previously described are also suitable for optimizing the PLT stub code. For example, in an alternative embodiment the calling function and PLT stub code are relocated to relocation address space.

At step 368, the system program counter is restored to continue the executable program at the target of the branch instruction, and program execution continues at step 360. While not shown, it will be appreciated that if the calling procedure and optimized PLT stub code are relocated to relocation address space (as shown in FIG. 2), then the first instruction of the calling procedure in the original address space must be patched with a branch to the relocated procedure as described in step 320 of FIG. 4.

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for optimization of an executable program that calls procedures in a shared library, comprising:

identifying linkage code segments in the executable program, wherein each linkage code segment is associated with a call to a procedure in the shared library, reads procedure address information from a linkage table, and transfers control to an associated one of the procedures;

reading the address information from the linkage table;

generating respective substitute code segments for the linkage code segments, each substitute code segment having references to the linkage table replaced by direct loads of the address information without reference to the linkage table; and executing the substitute code segments instead of the linkage code segments.

2. The method of claim 1, further comprising:

allocating relocation address space for the executable program;

storing the substitute code segments in the relocation address space.

3. The method of claim 1, further comprising for each calling procedure that calls a called procedure in the shared library:

identifying registers that are not used by the calling procedure;

generating in a substitute code segment instructions that store in the registers the address information read from the linkage table.

4. The method of claim 1, further comprising:

annotating linkage code segments in the executable program during compilation;

placing breakpoints at locations of the linkage code segments as indicated by the annotations; and upon encountering a breakpoint at a linkage code segment, generating a substitute linkage code segment.

5. The method of claim 4, further comprising:

identifying in the annotations registers that are not used by a calling procedure that calls a called procedure in the shared library; and generating in a substitute code segment instructions that store in the registers indicated by the annotations the address information read from the linkage table.

6. The method of claim 1, wherein the executable program includes a calling procedure that calls a first procedure and a second procedure in a first shared library and calls a third procedure in a second shared library, further comprising:

identifying a set of registers that are not used by the calling procedure;

generating in a substitute code segment instructions that store in the registers in the set the address information read from the linkage table configuring a substitute code segment associated with the first procedure to load the address information from one of the registers in the set into a branch register prior to transferring control to the first procedure; and eliminating from a substitute code segment associated with the second procedure, an instruction that loads the address information into the one of the registers if the second procedure is called after the first procedure and before the third procedure.

7. The method of claim 1, wherein the executable program includes a call to a first procedure in a first shared library that calls a second procedure in a second shared library, further comprising in the substitute code segment associated with the call by the first procedure to the second procedure, replacing an indirect branch instruction that targets the second procedure with an instruction-pointer relative branch instruction that targets the second procedure.

8. The method of claim 1, further comprising:

placing breakpoints at procedure entry points;

upon encountering a breakpoint at the entry point of a procedure during program execution, searching for linkage code segments in the procedure, generating substitute linkage code segments for those identified in the procedure, and continuing with execution of the procedure.

9. The method of claim 8, further comprising:

allocating relocation address space for the executable program;

storing the substitute code segments in the relocation address space.

10. The method of claim 8, further comprising for each calling procedure that calls a called procedure in the shared library:

identifying registers that are not used by the calling procedure;

generating in a substitute code segment instructions that store in the registers the address information read from the linkage table.

11. The method of claim 8, wherein the executable program includes a call to a first procedure in a first shared library that calls a second procedure in a second shared library, further comprising in the substitute code segment associated with the call by the first procedure to the second procedure, replacing an indirect branch instruction that targets the second procedure with an instruction-pointer relative branch instruction that targets the second procedure.

12. An apparatus for optimization of an executable program that calls procedures in a shared library, comprising:

means for identifying linkage code segments in the executable program, wherein each linkage code segment is associated with a call to a procedure in the shared library, reads procedure address information from a linkage table, and transfers control to an associated one of the procedures;

means for reading the address information from the linkage table;

means for generating respective substitute code segments for the linkage code segments, each substitute code segment having references to the linkage table replaced by direct loads of the address information without reference to the linkage table; and means for executing the substitute code segments instead of the linkage code segments.

13. A computer-implemented method for optimization of an executable program, comprising:

during execution of a program that calls procedures in a shared library, identifying linkage code segments in the executable program, wherein each linkage code segment is associated with a call to a procedure in the shared library, reads procedure address information from a linkage table, and transfers control to an associated one of the procedures;

reading the address information from the linkage table;

generating respective substitute code segments for the linkage code segments, each substitute code segment being a copy of a linkage code segment with references to the linkage table in the linkage code segment replaced by direct loads of the address information without reference to the linkage table; and executing the substitute code segments instead of the linkage code segments, wherein each linkage code segment transfers control to a procedure in the shared library without referencing the linkage table.

14. The method of claim 13, further comprising:

during execution of the program that calls procedures in a shared library, allocating a first address space for the program and additional address space for substitute code segments; and writing the substitute code segments to the additional address space.

15. The method of claim 14, further comprising:

during execution of the program that calls procedures in a shared library, in response to a call to a first procedure in the shared library made within a second procedure in the program and a linkage code segment that references the linkage table for addressing the first procedure, copying the second procedure from the first address space to the additional address space; and overwriting a first instruction in the second procedure in the first address space, with branch instruction that branches to the second procedure in the additional address space.

16. The method of claim 13, further comprising:

during execution of the program that calls procedures in a shared library,
- identifying each calling procedure that calls a called procedure in the shared library;
- identifying registers that are not used by the calling procedure; and
- generating in a substitute code segment instructions that store in the registers the address information read from the linkage table by a linkage code segment.

17. An article of manufacture, comprising:

a processor-readable medium configured with instructions that when executed cause a processor, during execution of a program that calls procedures in a shared library, to,
- identify linkage code segments in the executable program, wherein each linkage code segment is associated with a call to a procedure in the shared library, reads procedure address information from a linkage table, and transfers control to an associated one of the procedures;
- read the address information from the linkage table;
- generate respective substitute code segments for the linkage code segments, each substitute code segment being a copy of a linkage code segment with references to the linkage table in the linkage code segment replaced by direct loads of the address information without reference to the linkage table; and
- execute the substitute code segments instead of the linkage code segments, wherein each linkage code segment transfers control to a procedure in the shared library without referencing the linkage table.

18. The article of manufacture of claim 17, further comprising:

instructions on the medium that when executed cause the processor, during execution of the program that calls procedures in a shared library, to
- allocate a first address space for the program and additional address space for substitute code segments; and
- write the substitute code segments to the additional address space.

19. The article of manufacture of claim 18, further comprising:

instructions on the medium that when executed cause the processor, during execution of the program that calls procedures in a shared library, to
- in response to a call to a first procedure in the shared library made within a second procedure in the program and a linkage code segment that references the linkage table for addressing the first procedure, copy the second procedure from the first address space to the additional address space; and
- overwrite a first instruction in the second procedure in the first address space, with branch instruction that branches to the second procedure in the additional address space.

20. The article of manufacture of claim 17, further comprising:

instructions on the medium that when executed cause the processor, during execution of the program that calls procedures in a shared library, to
- identify each calling procedure that calls a called procedure in the shared library;
- identify registers that are not used by the calling procedure; and
- generate in a substitute code segment instructions that store in the registers the address information read from the linkage table by a linkage code segment.

* * * * *

UNITED STATES PATENT AND TRADEMARK OFFICE
CERTIFICATE OF CORRECTION

PATENT NO. : 6,934,943 B2
APPLICATION NO. : 10/004015
DATED : August 23, 2005
INVENTOR(S) : Robert Hundt et al.

It is certified that error appears in the above-identified patent and that said Letters Patent is hereby corrected as shown below:

On the title page, item (73), in "Assignee", in column 1, line 2, after "Company," insert -- L.P., --.

Signed and Sealed this

Eleventh Day of August, 2009

David J. Kappos
*Director of the United States Patent and Trademark Office*